United States Patent Office 3,450,674
Patented June 17, 1969

3,450,674
POLY-N-HETEROCYCLICS AND METHOD
Wilhelm E. Walles, Midland, Mich., assignor to The Dow Chemical Company, Midland, Mich., a corporation of Delaware
No Drawing. Filed Oct. 4, 1963, Ser. No. 313,776
Int. Cl. C08g 20/10; C07d 85/28, 87/34
U.S. Cl. 260—77.5    19 Claims

ABSTRACT OF THE DISCLOSURE

Novel monomeric compositions are prepared having the formula:

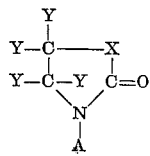

(Formula I)

wherein X is selected from the group consisting of —O—, —CH$_2$—, —OCH$_2$—,

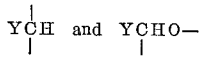

The dashes indicate valence bonds for attachments to carbons within the N-heterocyclic ring structure. One of the Y groups is selected from the group consisting of fluoromethyl, chloromethyl, bromomethyl and iodomethyl groups and each of the remaining Y groups is independently selected from the group consisting of hydrogen and alkyls having up to 2 carbons. The symbol A represents an alkali metal. These novel monomeric compositions are polymerized to form both water-soluble and water-insoluble polymers. The water soluble polymers may be used as soil suspending agents, dye assisting or plasticizing adjuvants for synthetic textile fibers, hair setting compositions and clarifying agents in beverages. The water insoluble polymers are thermoplastic and can be molded or extruded to provide useful shapes and fibers.

---

This invention relates to novel compositions and methods for their manufacture. Particularly, the invention concerns novel polymers of N-heterocyclic moieties of the general chemical families characterized as carbamates, lactams and morpholinones.

In recent years there have been numerous developments relating to poly-N-vinyl cyclic carbamates, lactams and morpholinones. Illustrative of some of these developments are the teachings contained in United States Patents 2,819,058; 2,874,124; 2,946,772; 2,948,656; 2,948,708 and 3,000,830. Among specific uses taught for these polymers is the employment of polyvinyl oxazolidinones and polyvinyl pyrrolidinones as soil suspending agents. Copolymers of N-vinyl oxazolidinone, N-vinyl-3-morpholinone or N-vinyl pyrrolidinone are described as dye assisting or plasticizing adjuvants for synthetic textile fibers. The polyvinyl pyrrolidinones and polyvinyl oxazolidinones are also described for employment in hair setting compositions. Other utilities include the use of such water-soluble polymers as clarifying agents in beverages.

It would be desirable, and it is an object of the invention to provide novel polymers for uses such as the foregoing. It is also an object to provide novel polymerizable N-heterocyclic compounds. Particularly, it is a further object to obviate the need for vinylation of the N-heterocyclic compounds which reaction is essential to the preparation of the above-described prior art polymers. These objects and other benefits as will become apparent hereinafter are accomplished in the practice of the invention.

The present invention is based upon the discovery of a system of novel polymers of N-heterocyclic compounds belonging generally to the classes of methylene bridged polymers of oxazolidinones, oxazinidinones, morpholinones and pyrrolidinones. Both water-insoluble and water-soluble linear polymers are prepared depending upon the polymerization conditions employed.

The novel monomeric compositions of the invention are characterized according to the following formula:

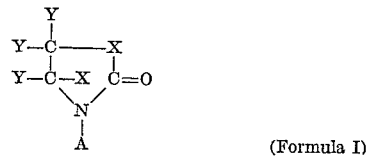

(Formula I)

wherein X is selected from the group consisting of —O—, —CH$_2$—, —OCH$_2$—,

The dashes indicate valence bonds for attachment to carbons within the N-heterocyclic ring structure. One of the Y groups is selected from the group consisting of fluoromethyl, chloromethyl, bromomethyl and iodomethyl groups and each of the remaining Y groups is independently selected from the group consisting of hydrogen and alkyls having up to 2 carbons. The symbol A represents an alkali metal.

The illustrative compounds of the Formula I include 3-sodium-5-chloromethyl-2-oxazolidinone,
3-potassium-5-chloromethyl-2-oxazolidinone,
3-sodium-5-bromomethyl-2-oxazolidinone,
3-cesium-5-chloromethyl-2-oxazolidinone,
3-sodium-4-ethyl-5-chloromethyl-2-oxazolidinone,
3-potassium-4-chloromethyl-2-oxazolidinone,
3-potassium-4-fluoromethyl-2-oxazolidinone,
3-sodium-5-iodomethyl-2-oxazolidinone,
3-sodium-6-chloromethyl-2-oxazinidinone,
3-sodium-5-chloromethyl-2-oxazinidinone,
3-sodium-4-bromomethyl-5-methyl-2-oxazinidinone,
3-sodium-5-bromomethyl-6-methyl-2-oxazinidinone,
4-sodium-6-chloromethyl-3-morpholinone,
4-potassium-5-chloromethyl-3-morpholinone,
4-sodium-5-methyl-6-chloromethyl-3-morpholinone,
2-chloromethyl-4-sodium-3-morpholinone,
1-sodium-4-chloromethyl-2-pyrrolidinone,
1-potassium-4-bromomethyl-2-pyrrolidinone,
1-potassium-5-chloromethyl-2-pyrrolidinone,
1-sodium-4-chloromethyl-5,5-diethyl-2-pyrrolidinone, and
1-sodium-4-chloromethyl-4-ethyl-2-pyrrolidinone.

The above monomers are prepared via the general route of first synthesizing the monohalomethyl derivatives of the particular N-heterocyclic form desired, substitution being on a ring carbon, and subsequently reacting the derivative with an alkali metal.

An illustration of a suitable reaction technique to prepare the halomethyl derivatives of the oxazolidinones is found in United States Patent 2,520,150. This patent specifically contains a description of preparative reactions for 5-chloromethyl-2-oxazolidinone.

A more general reaction involves condensation of urea with any of a wide variety of halomethylated alkanolamines wherein the hydroxy and amino groups are separated by intervening two or three carbons. With two intervening carbons halomethyl substituted oxazolidinones are prepared. Oxazinidinones of like substitution are obtained when 3 carbons separate the hydroxy and amino groups. This general reaction is described in more detail in United States Patent 3,065,130.

The chloromethylated morpholinones are obtained by first etherifying the halomethylated alkanolamines used to prepare the substituted oxazolidinones with an α-chloroacetic or α,α-chlorohalomethylacetic acid ester of a lower alkyl alcohol. This can be accomplished by the Williamson ether synthesis. Such an ether, as shown in the following equation, can be heated in a suitable inert organic solvent, e.g., an aromatic hydrocarbon such as toluene, to effect ring closure in the illustrated manner.

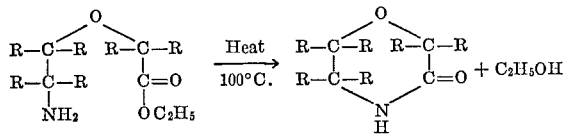

Equation (A)

In the foregoing formula, one of the R groups is selected from halomethyl groups inclusive of fluoro-, chloro-, bromo- and iodomethyl groups and each of the remaining R groups is selected from the group consisting of hydrogen and alkyls having up to 2 carbons. Preferably the halomethyl groups are selected from the group consisting of chloromethyl and bromomethyl groups.

The halomethylated pyrrolidinones are readily prepared by the ring closure of amino acid derivatives according to the following equation wherein references to R groups have the same meaning as above.

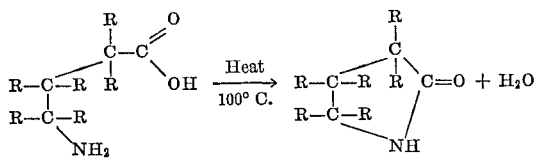

Equation (B)

The required salt forms of the aforedescribed halomethyl substituted N-heterocyclics are prepared by reacting the N-heterocyclic compound with an alkali metal. While other solvents for the monomer precursor can be used, the alkali metal salt forms are preferably formed in a liquid ammonia solution of the N-heterocyclic compound derivative. For instance, the various alkali metal derivatives are prepared by first dissolving a predetermined quantity of an alkali metal in liquid ammonia under a blanket of nitrogen in a vessel cooled by a Dry Ice-acetone bath. Subsequently, a quantity of the N-heterocyclic to be reacted is dissolved in the solution of the alkali metal. A white precipitate forms in the liquid ammonia and is readily recovered by permitting the ammonia to evaporate. The solid monomeric product thus recovered is capable of self-polymerization under the influence of heat. When maintained at moderate temperatures, e.g., normal room temperatures, the monomer is stable for long periods of time under exposure to the atmosphere.

The polymers of the invention are obtained as the self-condensation products of at leas tone of the aforedescribed salt forms of the halomethyl derivatives of the N-heterocyclic compounds. Particularly, the resulting polymethamer-alt-N-heterocyclic has repeating units such as those within the brackets of the following general formula:

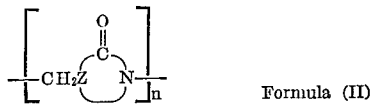

Formula (II)

In the formula Z is a trivalent group contributing from 3 to 4 atoms to complete a ring structure corresponding to a 2-oxazolidinone, 2-oxazinidinone, 3-morpholinone or 2-pyrrolidinone structure. Particularly, Z is composed of at least 3 carbons and, when applicable, one oxygen. Aside from the possibility of the presence of one oxygen atom in the group, Z is otherwise composed of carbon and hydrogen. The small letter $n$ outside the brackets in the above formula refers to the average degree of polymerization. An average degree of polymerization as low as 4 and as great as about 2,000 or more can be obtained conveniently. Water-soluble polymers are ordinarily obtained at lower degrees of polymerization, e.g., up to as much as 100. Above this level the polymers tend to become water-insoluble.

Specific polymers of the invention include polymethamer-alt-2-oxazolidinones-3,5 polymethamer-alt-2-oxazinidinone-3,6, polymethamer-alt-3-morpholinone-4,6, and polymethamer-alt-2-pyrrolidinone-1,4.

Polymerization, i.e., condensation, of the N-alkali metal halomethyl substituted N-heterocyclics of Formula I is accomplished by dissolving them in an inert organic liquid and thereafter heating the solution up to the condensing temperature of the monomer which is at least 50° C., preferably at least about 150° C. Upon self-condensation the N-heterocyclic monomers form a linear polymer as indicated by Formula II with the splitting out of an alkali metal halide by-product. Some polymer of a lower degree of polymerization is obtained almost immediately upon bringing the solution up to the condensing temperature of the monomers. However, for more complete conversions to a polymeric product the heating should be continued for at least about 30 minutes and may be continued, if desired, for substantially greater periods of time, e.g., several days, without causing significant deleterious decomposition or degradation of the polymer. Generally, if water-soluble polymers are desired, the condensation reaction should not be continued beyond that point at which in insoluble phase first begins to appear in the polymerizate. Depending upon the temperature at which the reaction is conducted, and the concentration of the condensing monomer in the reaction system, effective conversion to a water-soluble polymer can usually be accomplished within 6 hours or less. As the reaction time extends beyond this period, the molecular weights of the condensates tend to become so great as to diminish the general solubility properties of the polymers. That is, the range or number of solvents in which they are soluble is decreased.

The inert organic liquid employed as the polymerization reaction medium is characterized as having conjunctively a boiling point above about 160° C. and a melting point below 120° C. It is a solvent for the monomer but need not be a solvent for the polymerized product. Solution concentrations of the monomer in the polymerization system are not critical but in general the concentration of the condensible monomer is maintained above about 5 percent and below about 50 percent of the total system. At higher concentrations the polymerized product tends to become too highly viscous for convenient handling and recovery of the finished polymer.

Organic materials useful as polymerization reaction media include, for example, n-nonane, cumene, anisole, α-pinene, monobromobenzene, mesitylene, β-pinene, methyl-n-hexyl ketone, n-decane, limonene, indene, decaline and naphthalene. A convenient and preferred class of solvents consists of the liquid cyclic carbamate, lactam and morpholinone moieties which are precursors to the aforedescribed halomethyl, salt derivatives thereof. Illustratively, oxazolidinone, pyrrolidinone and morpholinone are convenient solvents for the polymerization reaction, particularly for self-condensible monomers under the invention of similar ring structure. In general, any organic material, which is liquid under the mentioned polymerization temperature conditions and inert to the condensing monomers, i.e., free of polar groups reactive with the halomethyl groups such as —OH and —NH$_2$, can be used.

Upon completion of the polymerization reaction, the polymer can be recovered from the reaction medium by any one of several convenient separatory processes depending upon its particular solubility characteristics. For instance, inasmuch as some of the polymers of the invention, particularly those of higher molecular weights, are insoluble in the dispersing media used, they can be recovered as solid products by direct filtration of the polymerization system. After recovery of the polymer washing with a hot solvent such as methanol or ethanol removes residual amounts of the polymerization reaction medium. The alkali metal halide by-product of the polymerization reaction is conveniently removed from the polymer product by dialysis of an aqueous dispersion of the polymer.

When soluble, particularly water-soluble, polymers of at least one of the aforedescribed monomer compositions of Formula I are prepared, separation of the polymer from the reaction system can be accomplished by distilling off the reaction dispersing medium under reduced pressures. Separation of the alkali metal halide reaction by-product from the soluble polymer product remaining within the still is accomplished by dissolving such product in water and precipitating the polymer by adding a water-miscible organic solvent such as methanol or acetone to the polymer solution. The precipitated polymer is recovered by filtration leaving the alkali metal halide by-product dissolved in the aqueous filtrate.

The water-soluble polymers of the invention are useful in any of the wide variety of applications for the polymerized forms of the N-vinyl derivatives of the cyclic carbamates, lactams and morpholinones as previously discussed. A specific use for the water-soluble polymers involves the clarification of beverages in the manner of United States Patents 2,872,321, 2,872,322 and 2,873,192. The higher molecular weight, water-insoluble linear polymers of the invention are thermoplastic and can be molded or extruded to provide useful shapes and fibers.

The present invention is illustrated by the following examples wherein all parts and percentages are based on weight unless otherwise specified.

EXAMPLE 1

Preparation of 5-chloromethyl-2-oxazolidinone 0.5 mole of magnesium sulfate heptahydrate was dissolved in 200 milliliters of water. To the resulting solution was added an aqueous solution of potassium cyanate consisting of 40.6 grams of the salt in 75 milliliters of water. The admixture of the two solutions was stirred with a magnetic stirrer at room temperature while 0.25 mole of epichlorohydrin was added over a period of 15 minutes. After stirring for one hour, a white crystalline precipitate began to appear in the reaction system. To insure substantial completion of the reaction, the stirring was continued at room temperature for an additional 2 hours. Thereafter, the reaction system was extracted with two 400 milliliter aliquots of ethyl acetate which dissolved the precipitate. The ethyl acetate solution eluate was dried and evaporated to yield a white crystalline product. This product was identified as 5-chloromethyl-2-oxazolidinone. Its melting point was 106° C. The reaction yield was 52.5 percent of the theoretical yield.

EXAMPLE 2

Preparation of monomer

The above-prepared 5 - chloromethyl - 2-oxazolidinone was dissolved in 904 grams of dioxane. Sodium metal was added to this solution and its temperature maintained within the range from about 50° to 60° C. The sodium dissolved slowly with the evolution of hydrogen gas. The reaction system was maintained under these conditions for a period of 3 days. The desired N-sodio-5-chloromethyl-2-oxazolidinone precipitated as it formed in the reaction medium. Ultimately, the precipitate was isolated by filtering the liquid reaction system. The yield of the desired monomer appearing as a white powder was nearly quantitative.

EXAMPLE 3

Preparation of polymer 80 grams of the N-sodio-5-chloromethyl-2-oxazolidinone were added to 200 grams of naphthalene at 85° C. After addition of the monomer, the solution was heated at 160° C. for 6 hours. During this period a white precipitate formed consisting of the sodium chloride by-product from self-condensation of the monomer.

The reaction system was then treated with hot benzene to elute the naphthalene reaction medium thereby leaving the polymer product, which was insoluble in both benzene and water, as a solid residue. Sodium chloride was removed from this residue by dispersing it in water and filtering. The filter cake consisted essentially of pure polymethamer-alt-oxazolidinone-3,5.

In addition to benzene and water, the purified polymer was insoluble in ethanol, dimethylformamide and acetic acid. It was soluble, however, in 5-methyl-2-oxazolidinone at 200° C. Its limited solubility indicated the polymer was characterized by high molecular weight, i.e., a degree of polymerization of at least about 100. The polymer was thermoplastic at temperatures above about 100° C.

Such polymers are utilized in a conventional manner as molding plastics in the fabrication of shaped articles with or without the incorporation of an inert filler. Optionally, the polymer is dissolved in a carbamate solvent and cast into films or extruded into fibers.

Portions of the above-prepared polymer were repeatedly washed with water. Two elemental analyses of the washed polymer yielded the results reported below. The analytical results are compared with calculated percentages based on a polymer structure corresponding to the theoretical self-condensation polymer product of N-sodio-5-chloromethyl-2-oxazolidinone.

Elemental analysis of polymer.—Polymer (percent): C, 51.01; H, 5.98; N, 14.93. Theoretical (percent): C, 48.50; H, 5.05; N, 14.15.

EXAMPLE 4

Preparation of water-soluble polymers 80 grams of N-sodio-5-chloromethyl-2-oxazolidinone were added to 200 milliliters of 5-methyl-2-oxazolidinone. The resulting solution was maintained at 170° C. for 4 hours. During this period, sodium chloride precipitated in the reaction medium. Subsequently, the reaction mass was filtered to remove the insoluble by-product and the reaction medium evaporated to recover a white, polymeric condensation product of the starting monomer. The polymer was readily dissolved in water to provide an aqueous sol in which form the polymer was useful as a complectant for free iodine and bromine in aqueous solutions.

EXAMPLE 5

Other monomers of the invention such as those disclosed hereinbefore as illustrative compounds of Formula I are prepared in a manner similar to that of Example 2 by dissolving a halomethyl, i.e., fluoromethyl, chloromethyl, bromomethyl or iodomethyl ring carbon substituted derivative of oxazinidinone, morpholinone or pyrrolidinone in a solution of sodium, potassium or cesium in liquid ammonia under a nitrogen atmosphere. As the monomer precursor is added to the ammonia solution of the alkali metal, a white precipitate forms which is readily recovered subsequent to completion of the reaction by either filtering the solution or permitting the ammonia to evaporate. In this manner the following self-condensible alkali metal N-heterocyclic monomers are obtained:

3-sodium-5-chloromethyl-2-oxazolidinone;
3-potassium-5-chloromethyl-2-oxazolidinone;
3-cesium-5-chloromethyl-2-oxazolidinone;
3-sodium-5-fluoromethyl-2-oxazolidinone;
3-potassium-5-bromomethyl-2-oxazolidinone;
3-cesium-5-iodomethyl-2-oxazolidinone;

3-sodium-6-chloromethyl-2-oxazinidinone;
3-potassium-6-chloromethyl-2-oxazinidinone;
3-cesium-6-chloromethyl-2-oxazinidinone;
3-sodium-6-fluoromethyl-2-oxazinidinone;
3-potassium-6-bromomethyl-2-oxazinidinone;
3-cesium-6-iodomethyl-2-oxazinidinone;
4-sodium-6-chloromethyl-3-morpholinone;
4-potassium-6-chloromethyl-3-morpholinone;
4-cesium-6-chloromethyl-3-morpholinone;
4-sodium-6-fluoromethyl-3-morpholinone;
4-potassium-6-bromomethyl-3-morpholinone;
4-cesium-6-iodomethyl-3-morpholinone;
1-sodium-4-chloromethyl-2-pyrrolidinone;
1-potassium-4-chloromethyl-2-pyrrolidinone;
1-cesium-4-chloromethyl-2-pyrrolidinone;
1-sodium-4-fluoromethyl-2-pyrrolidinone;
1-potassium-4-bromomethyl-2-pyrrolidinone; and
1-cesium-4-iodomethyl-2-pyrrolidinone.

Polymers of such self-condensible monomers are obtained in a manner similar to that of Examples 3 and 4. For instance, the monomers are dissolved in liquid forms of the ring structure precursor to the monomer in concentrations of about 30 percent by weight. The resulting solutions are heated at 200° C. under autogenous pressure for approximately 2 hours. As described in the above examples, the alkali halide, i.e., sodium, potassium and cesium fluorides, chlorides, bromides and iodides are precipitated during the condensation reaction. Subsequently the reaction system is filtered to remove the insoluble halides and filtrate evaporated to dryness to provide self-condensation polymer of the starting monomer. Specific polymers prepared in this manner are polymethamer-alt-2-oxazolidinone - 3,5; polymethamer-alt-2-oxazinidinone-3,6; polymethamer-alt-3-morpholinone-4,6; and polymethamer-ala-2-pyrrolidinone-1,4.

What is claimed is:
1. A novel composition of matter having the formula:

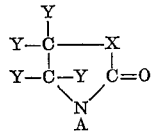

wherein X is selected from the group consisting of —O—, —CH₂—, —OCH₂—,

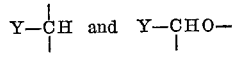

one of the Y groups is selected from the group consisting of fluoromethyl, chloromethyl, bromomethyl and iodomethyl groups and each of the remaining Y groups is independently slected from the group consisting of hydrogen and alkyls having up to 2 carbons and A is an alkali metal.
2. 3-sodium-5-chloromethyl-2-oxazolidinone.
3. 3-potassium-5-chloromethyl-2-oxazolidinone.
4. 3-sodium-6-chloromethyl-2-oxazinone.
5. 3-potassium-6-chloromethyl-2-oxazinone.
6. 4-sodium-6-chloromethyl-3-morpholinone.
7. 4-potassium-6-chloromethyl-3-morpholinone.
8. 1-sodium-4-chloromethyl-2-pyrrolidinone.
9. 1-potassium-4-chloromethyl-2-pyrrolidinone.
10. A polymethamer-alt-N-heterocyclic polymer having the formula:

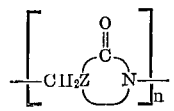

wherein Z is a trivalent group consisting of elements selected from the group consisting of carbon, hydrogen and oxygen, said trivalent groups contributing from 3 to 4 atoms to complete a ring structure corresponding to an N-heterocyclic selected from the group consisting of 2-oxazolidinone, 2-oxazinidinone, 3-morpholinone, 2-pyrrolidinone and alkyl derivatives of the foregoing wherein each alkyl group contains up to two carbons inclusive and is attached to a ring carbon atom and n represents a degree of polymerization of at least 4.
11. Polymethamer-alt-2-oxazolidinone-3,5 having a degree of polymerization of at least 4.
12. Polymethamer-alt-2-oxazinone-3,6 having a degree of polymerization of at least 4.
13. Polymethamer-alt-3-morpholinone-4,6 having a degree of polymerization of at least 4.
14. Polymethamer-alt-2-pyrrolidinone-1,4 having a degree of polymerization of at least 4.
15. A method which comprises the steps of dissolving in an inert organic liquid substantially free of amino and hydroxyl groups a monomer composition of the formula:

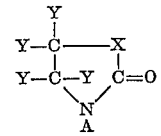

wherein X is selected from the group consisting of —O—, —CH₂—, —OCH₂—,

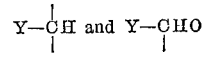

one of the Y groups is selected from the group consisting of fluoromethyl, chloromethyl, bromomethyl and iodomethyl groups and each of the remaining Y groups is independently selected from the group consisting of hydrogen and alkyls having up to 2 carbons and A is an alkali metal; and heating the resulting solution above the temperature at which the monomer composition undergoes self-condensation whereby a condensation polymer is obtained having a degree of polymerization of at least 4.
16. A method as in claim 15 wherein the solution is heated at a temperature above about 50° C. for at least 30 minutes.
17. A method as in claim 15 wherein the inert organic liquid is characterized as having conjunctively a boiling point of above about 160° C. and a melting point below 120° C.
18. A method as in claim 17 wherein the amount of the monomer composition utilized is from about 5 percent to about 50 percent of the total solvent-monomer solution.
19. A method as in claim 15 including the additional step of separating the polymer from the inert organic liquid.

References Cited

Katc Halski et al., J. Ory Chem., vol. 15, pp. 1067–73 (1950).

HENRY R. JILES, Primary Examiner.

R. T. BOND, Assistant Examiner.

U.S. Cl. X.R.

8—85; 260—30.4, 307, 482, 534, 78, 244, 247.7, 326.4; 425—71